(12) United States Patent
Moteki et al.

(10) Patent No.: US 6,863,435 B2
(45) Date of Patent: Mar. 8, 2005

(54) SPRING, MAINSPRING, HAIRSPRING, AND DRIVING MECHANISM AND TIMEPIECE BASED THEREON

(75) Inventors: Masatoshi Moteki, Shiojiri (JP); Fumio Takagi, Shiojiri (JP); Tatsuo Hara, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/859,929

(22) Filed: May 17, 2001

(65) Prior Publication Data

US 2001/0030908 A1 Oct. 18, 2001

Related U.S. Application Data

(62) Division of application No. 09/297,289, filed on Apr. 28, 1999.

(30) Foreign Application Priority Data

Aug. 11, 1997 (JP) .............................. 9-216775

(51) Int. Cl.⁷ .............................. G04B 1/10; B60G 11/14
(52) U.S. Cl. ........................ 368/140; 368/175; 267/272
(58) Field of Search ................................ 368/140, 174, 368/175, 327, 10, 154, 142; 267/154, 272, 273, 160; 185/37–39, 45, 40 R, 40 A, 40 B–40 F, 40 H, 40 L, 40 M, 40 S; 310/355; 81/76.5; 396/389; 248/624, 625, 630; 420/417, 422

(56) References Cited

U.S. PATENT DOCUMENTS

| | | | | |
|---|---|---|---|---|
| 2,833,027 A | * | 5/1958 | Foster | 29/896.9 |
| 2,833,534 A | * | 5/1958 | Foster | 267/156 |
| 2,979,417 A | | 4/1961 | Kruger et al. | |
| 3,647,025 A | * | 3/1972 | Paya Rico | 185/39 |
| 4,015,421 A | * | 4/1977 | Murrle | 368/143 |
| 4,116,728 A | * | 9/1978 | Becker et al. | 148/108 |
| 4,155,397 A | * | 5/1979 | Honsinger et al. | 164/5 |
| 4,341,260 A | | 7/1982 | Ishibachi et al. | |
| 4,380,572 A | * | 4/1983 | Liebermann et al. | 428/592 |
| 4,428,416 A | | 1/1984 | Shimanuki et al. | |
| 4,595,184 A | * | 6/1986 | Bohm et al. | 267/156 |
| 4,635,755 A | * | 1/1987 | Arechaga | 185/45 |
| 4,740,410 A | * | 4/1988 | Muller et al. | 428/133 |
| 4,763,030 A | * | 8/1988 | Clark et al. | 310/26 |
| 5,517,469 A | | 5/1996 | Wiget | |
| 5,668,362 A | * | 9/1997 | Plesko | 235/462.36 |
| 5,772,803 A | * | 6/1998 | Peker et al. | 148/403 |
| 6,603,236 B2 | * | 8/2003 | Nagasaka | 310/254 |
| 6,763,915 B2 | * | 7/2004 | Nagao et al. | 185/37 |
| 2002/0153807 A1 | * | 10/2002 | Schwartz et al. | 310/328 |

FOREIGN PATENT DOCUMENTS

| | | | |
|---|---|---|---|
| CH | 46089 | 9/1908 | |
| CN | 1155107 A | 7/1997 | |
| DE | 3136303 | 4/1983 | |
| JP | 57-108318 | 12/1955 | |
| JP | 57-204528 | 6/1956 | |
| JP | 55050231 | * 4/1980 | 396/389 |
| JP | 57-108237 | 6/1982 | |
| JP | 59-123747 | 7/1984 | |
| JP | 3-8740 U | 1/1991 | |
| JP | 3-8740 | 1/1991 | |

* cited by examiner

Primary Examiner—Kamand Cuneo
Assistant Examiner—Jeanne-Marguerite Goodwin
(74) Attorney, Agent, or Firm—Stroock & Stroock & Lavan LLP

(57) ABSTRACT

A mainspring used as a power source for a driving mechanism is made of an amorphous metal sheet, and has an S-shaped free-exploded shape. The curvature changing point, where the curving direction of the free-exploded shape changes is formed on the inner end side of a middle point between the inner end on the winding side and the outer end serving as the other end of the inner end. Because of the high tensile stress and a low Young's modulus, the amorphous metal permits increase in mechanical energy stored in the mainspring.

33 Claims, 11 Drawing Sheets

(A)  (B)

SPRING, MAINSPRING, HAIRSPRING, AND DRIVING MECHANISM AND TIMEPIECE BASED THEREON

CROSS REFERENCE INFORMATION

This application is a division of U.S. application Ser. No. 09/297,289, filed Apr. 28, 1999, and currently pending.

TECHNICAL FIELD

The present invention relates to a spring used in a precision machine such as a timepiece, applicable, for example, as wielding means for fixing a crystal oscillator composing a timepiece or the like, or as a power source for a driving mechanism of a timepiece, a music box or the like.

BACKGROUND ART

Various springs have conventionally been adopted in precision machines such as a timepiece and a music box. In a timepiece, for example, there are known a spring fixing a crystal oscillator of a crystal oscillating timepiece in a wielded state, a mainspring composing a power source for a driving mechanism of a timepiece, a click spring provided for preventing back-winding upon winding a mainspring, and a hairspring wielding a timed annular balance in a mechanical timepiece.

Conventional materials applicable for these springs include spring materials and mainspring materials such as carbon steel, stainless steel, a cobalt alloy, and a copper alloy. These materials have however the following problems.

1. The spring fixing a crystal oscillator in a wielded state poses a problem in that the wielding force of the spring causes a shift in the pace of the crystal oscillator. More specifically, dispersion of the spring wielding force causes a gain or a loss of the period of a 32 kHz signal issued by the crystal, and this leads to a problem of a shift of accuracy of a timepiece using this signal as a reference signal. The smallest possible dispersion of wielding force is therefore required for a spring fixing the crystal oscillator.

2. In a hairspring wielding a timed annular balance forming a governor for a mechanical timepiece, a temperature change results in a change in Young's modulus which in turn causes dispersion of the wielding force, and hence a change in the oscillating period of the timed annular balance. This change in the oscillating period of the timed annular balance exerts an important effect on the accuracy of a mechanical timepiece. It is therefore desirable to adopt a hairspring material, of which Young's modulus does not change under the effect of a change in temperature.

3. Further, in the case of a mainspring serving as a power source for a driving mechanism of a timepiece or the like, a mainspring satisfying contradictory requirements of a long-time operation of the driving mechanism and downsizing of the driving mechanism is demanded. More specifically, for example, a driving mechanism of a timepiece comprises a mainspring serving as a power source, a barrel drum housing the mainspring, and a train wheel transmitting a mechanical energy of the mainspring by engaging with the barrel drum. Hands of the timepiece are rotated, via a transmitting unit such as the train wheel, by the use of the rotation force produced by the release of the tightly wound mainspring.

The number of turns of the mainspring serving as a power source of such a driving mechanism and the output torque are in a proportional relationship. When the output torque of the mainspring is T, the number of winding runs (number of turns) of the mainspring is N, Young's modulus is E, the total length of the mainspring is L, and the mainspring is assumed to have a rectangular cross-section having a thickness t and a width b, it is known that T can be expressed by:

$$T=(Et^3 b\pi/6L) \times N \qquad (1)$$

On the other hand, the total length L, the thickness t and the width b of the mainspring are dependent on the size of the barrel drum housing the mainspring. If the barrel drum has an inside radius R and a barrel arbor radius r, the total length L of the mainspring is determinable from the following formula:

$$L=\pi(R^2-r^2)/2t \qquad (2)$$

It is thus suggested that the total length L and the thickness t of the mainspring are in a inversely proportional relationship.

The mechanical energy accumulated in the mainspring is obtained by integrating the output torque of Equation (1) by the number of turns N, and Equation (1) is considered to be a function of the total length L and the thickness t of the mainspring. The spring energy has therefore conventionally been adjusted by controlling L and t.

This means that the maximum number of turns Nmax of the mainspring can be increased by reducing the mainspring thickness t and increasing the mainspring total length L.

On the contrary, the value of output torque T can be increased by reducing the total length L of the mainspring, and increasing the mainspring thickness t.

As is evident from Equation (2), however, in this manner of determination, the mainspring thickness t and the total length L are limited by the volume of the housing space within the barrel drum. When adopting a mainspring operable for a long period of time, therefore, it is necessary to use a larger-sized barrel drum and a larger housing space, thus leading to a problem of impossibility to downsize the driving mechanism including the mainspring.

It was once conceived to achieve a mainspring capable of outputting a high torque with a thinner thickness t by adopting a mainspring material having a high Young's modulus. This contrivance was however limited in terms of mainspring durability since it was difficult to maintain toughness of the mainspring.

The present invention has an object to provide a spring which permits achievement of a high accuracy and stable operation of a precision machine such as a timepiece, and to provide a spring enabling, when used as power source, to operate for a long period of time, and a driving mechanism having this spring as a power source.

DISCLOSURE OF INVENTION

1. Specification of Spring Material

The spring of the present invention comprises an amorphous metal.

An amorphous metal is adopted as a spring material with a view to selecting a spring material having a large tensile stress and a small Young's modulus. More specifically, comparison of a conventional mainspring material (chemical composition (wt. %): from 30 to 45% Co, from 10 to 20% Ni, 8 to 15% Cr, under 0.03% C, from 3 to 5% W, from 3 to 12% Mo, from 0.1 to 2% Ti, from 0.1 to 2% Mn, from 0.1 to 2% Si, and the balance Fe) and a spring comprising an amorphous metal reveals the following result:

|  | σmax (kgf/mm$^2$) | E (kgf/mm$^2$) |
| --- | --- | --- |
| Conventional material | 200 | 20,000 |
| Amorphous spring | 340 | 9,000–12,000 |

Applicable amorphous metals for the foregoing amorphous spring include, for example, Ni—Si—B, Ni—Si—Cr, Ni—B—Cr, and Co—Fe—Cr amorphous metals. Any of various amorphous metals can be adopted in response to the required performance of the spring.

When adopting a spring comprising an amorphous metal as described above, a higher allowable stress is available because of a higher maximum tensile stress of the amorphous spring, and as compared with a spring of the conventional material having the same shape, a higher wielding force is obtained: it is therefore suitable for downsizing a precision machine.

Since the spring comprises an amorphous metal, a wire or a ribbon can easily be manufactured by any of the single roll process, the dual roll process and the rotation underwater spinning process, thus permitting simplification of the spring manufacturing process.

Further, because of a satisfactory corrosion resistance of the amorphous metal, it is possible to eliminate the necessity of rust preventive plating for some portions.

When the spring comprising an amorphous metal is used as wielding means for fixing a crystal oscillator, it is possible to prevent a gain or a loss of the signal period of the crystal oscillator for the following reason. As described above, the spring comprising an amorphous metal has a low Young's modulus. As a result, the relationship between the amount of flexure $\epsilon$ of the spring and the wielding force F is as shown in FIG. 1: it takes the form of graph G2 having a smaller inclination than graph GI representing a conventional material of spring. Therefore, when the spring of the conventional material giving a wielding force F0 necessary for fixing the crystal oscillator has an amount of flexure $\epsilon 1$, and the amorphous spring has an amount of flexure $\epsilon 2$, and if a change $\delta$ occurs in the amounts of flexure $\epsilon 1$ and $\epsilon 2$ of the both springs, comparison of changes df1 and df2 in the wielding force F0 reveals that the change df2 in the wielding force of the amorphous spring is smaller. By adopting the amorphous spring as wielding means for fixing the crystal oscillator, therefore, it is possible to reduce dispersion of the wielding force, minimize the shift of the period of the crystal oscillator, and thus improve accuracy of the timepiece.

If a spring comprising an amorphous material is adopted as a hairspring for wielding a time annular balance forming a governor for a mechanical timepiece, a change in Young's modulus caused by a temperature change is smaller as compared with a usual hairspring material such as carbon steel. Upon occurrence of a change in temperature, a change in oscillating period resulting from dispersion of wielding force is slight, thus permitting improvement of a mechanical timepiece.

Further, when adopting a spring comprising an amorphous metal as a power source for a driving mechanism, i.e., in the case of a mainspring comprising an amorphous metal, achievement of long-time operation of the power source can be determined on the basis of the following concept.

More specifically, the flexure of a mainspring 31 (having a thickness t, a width b and a length L) can be approximately determined, as shown in FIG. 2, as a flexure of a cantilever supporting beam, of which the inner end 311 is rigidly connected to the barrel arbor 33, and the other outer end is left free. The flexure angle $\alpha$ (rad) in FIG. 2 can be expressed, when the mainspring 31 has a flexure radius r, by:

$$r = L/\alpha \quad (3)$$

The number of turns of the mainspring can be expressed, on the other hand, by means of the above-mentioned flexure angle $\alpha$ as follows:

$$N = \alpha/2\pi \quad (4)$$

The above-mentioned equation (1) can therefore be transformed, from equations (3) and (4), into:

$$T = (bt^3 E/12L) \times \alpha \quad (5)$$

An energy U accumulated by the flexure of the mainspring 31 can be calculated by integrating a bending moment acting on the mainspring 31, i.e., an output torque of the mainspring 31 as to $\alpha$:

$$U = \int T d\alpha = \int (bt^3 E/12L) \times \alpha d\alpha = (bt^3 E/24L) \times \alpha^2 \quad (6)$$

Consequently, the maximum energy Umax capable of being stored in a mainspring having a length L can be expressed, if the maximum flexure angle of the mainspring 31 is $\alpha$max, as follows:

$$U\max = (bt^3 E/24L) \times \alpha\max^2 \quad (7)$$

The bending stress $\sigma$ acting on the mainspring 31 is expressed as a function of the bending moment acting on the mainspring 31, i.e., the output torque T that the mainspring 31 in a flexure state can output. When the displacement in the thickness direction from the neutral axis A of the mainspring 31 is y, and the geometrical moment of inertia of the mainspring 31 is Iz, then the bending stress a is expressed as:

$$\sigma = Txy/Iz \quad (8)$$

Therefore, the maximum bending stress $\sigma$b in the tensile direction acting on the upper surface of the mainspring 31 in FIG. 2 calculated, from equation (8):

$$\sigma b = T(t/2)/Iz \quad (9)$$

The cross-sectional area of the mainspring 31, forming a rectangular shape with a thickness t and a width b, calculated as follows:

$$Iz = bt^3/12 \quad (10)$$

and from equations (9) and (10), this is expressed as:

$$T = (bt^2/6) \times \sigma b \quad (11)$$

Consequently, T is expressed, from equations (1) and (11), as follows:

$$T = (Et^3 b\pi/6L) \times N = (bt^2/6) \times \sigma b \quad (12)$$

The maximum number of turns Nmax giving $\alpha$ max in equation (7) is, from equation (4):

$$N\max = \alpha\max/2\pi \quad (13)$$

Therefore, the following relationship can be derived:

$$\alpha\max = 2L\sigma b/Et \quad (14)$$

It is therefore suggested that $\alpha$max is determined by the maximum bending stress $\sigma$b in the tensile direction of the mainspring 31, i.e., the maximum tensile stress $\sigma$max of the mainspring material used for the mainspring 31, and the above-mentioned equation (7) is calculated as follows:

$$U\max = (bt^3 E/24L) \times (2L\sigma\max/Et)^2 = (btL/6) \times (\sigma\max^2/E) \quad (15)$$

Equation (15) reveals that the maximum energy Umax stored in the mainspring 31 in FIG. 2 varies not only with the thickness t, the width b and the length L of the mainspring 31, but also with the maximum tensile stress $\sigma$max and Young's modulus E of the material forming the mainspring 31.

In order to increase the energy Umax stored in the mainspring, therefore, it is desirable to adopt, for the mainspring 31, a material having a high maximum tensile stress $\sigma$max and a low Young's modulus. In other words, when adopting the foregoing amorphous spring having $\sigma$max=340 (kgf/mm$^2$) and E=9,000 to 12,000 (kgf/mm$^2$) as a material for the mainspring 31, it is known from equation (15) that an amount of energy 4.8 to 6.4 times as large as that available in the conventional art can be stored.

By adopting an amorphous mainspring as a power source for the driving mechanism of a timepiece or a music box, therefore, it is possible to improve the energy volume density capable of being stored in the mainspring without the need to modify the geometry of the other parts such as the barrel drum. It is thus possible to achieve a long-time operation of the power source for the driving mechanism while permitting downsizing, and therefore, the amorphous mainspring is particularly suitable as a power source for the driving mechanism of a wristwatch requiring utmost efforts for downsizing.

When a spring comprising the amorphous metal as described above is used as a hairspring or a mainspring, it should preferably be a mainspring comprising a non-magnetic material. If the mainspring comprises a non-magnetic material, magnetic resistance is improved. Even when the mainspring is attracted by a magnetic field, properties of the mainspring are never deteriorated. When a spring comprising an amorphous metal is used for a fixed spring or a click spring for a crystal oscillator, the spring, if comprising a non-magnetic material, permits improvement of magnetic resistance, and the wielding force of the spring is never affected by a magnetic field or the like, as in the aforementioned case.

2. Optimum Shape of Spring Comprising Amorphous Metal

A spring comprising an amorphous metal should preferably have a cross-sectional shape of a circle having a diameter of at least 0.05 mm, or a rectangle having a size of at least a thickness of 0.01 mm×a width of 0.05 mm.

More specifically, when the spring has such a cross-sectional shape, a sufficient wielding force is available. It is therefore applicable as fixing means of a crystal oscillator, a hairspring wielding a timed annular balance serving a governor for a mechanical timepiece, or a mainspring serving as a power source for a driving mechanism.

A spring comprising an amorphous metal should preferably have a substrate or a main plate into which it is incorporated with an initial flexure.

Presence of an initial flexure prevents a play or a shift of the spring from occurring even incorporated in a substrate or a main plate. When there is an initial flexure, it is possible to apply a load from beginning. In a spring of the conventional material, a high Young's modulus results in a reduced allowance to the allowable stress. In the spring comprising the amorphous metal, in contrast, having a low Young's modulus, a sufficient margin of the allowable stress is ensured even when the initial flexure applies a load.

Further, when the aforementioned spring comprising the amorphous metal is used as a mainspring serving as a power source for a driving mechanism, this mainspring has a free-exploded shape of an S, and the curvature changing point where the curving direction of the free-exploded shape changes should preferably be located on the inner end side from the middle point between an inner end on the winding side and the other end which is an outer end.

The free-exploded shape of a mainspring means an exploded shape available when releasing the mainspring from the constraint, such as the shape of the mainspring taken out from the barrel drum.

In the free-exploded shape of the mainspring comprising a conventional material, as in graph G shown in FIG. 3, the shape is formed into an S closest to an ideal curve in which the curvature changing point (where the radius of curvature p is infinite, and the curving direction of the mainspring changes) is provided at the middle point C between the inner end and the outer end of the mainspring. The reason is as follows:

1. To previously reforming the mainspring in a direction counter to the winding direction to store as much as possible energy in the mainspring upon tightening the mainspring; and 2. To prevent breakage of the mainspring caused by stress concentration by causing the bending stress to uniformly act on the entire mainspring.

On the other hand, as described above, the amorphous mainspring has a smaller Young's modulus than in the conventional mainspring material, and this alleviates the limitation imposed by the second reason mentioned above, permitting reforming solely to achieve what is described in paragraph number 1 above.

More specifically, an optimum free-exploded shape of the amorphous mainspring is determined as follows.

If the spiral shape of a mainspring housed in a barrel drum upon tightly winding is assumed to be an Archimedes' spiral, and polar coordinates r and $\theta$ and adopted, r is expressed as:

$$r=(t/2\pi)\cdot\theta \qquad (16)$$

(where, t: mainspring thickness)

The conditions giving an ideal curve permitting available stress concentration over the entire mainspring is obtained from the following equation when assuming that the bending moment acting on the mainspring is M, bending rigidity of the mainspring is B, the radius of curvature of the mainspring in the free-exploded shape is $\rho0$, and the radius of curvature of the outer periphery portion of the mainspring upon tightening is $\rho1$:

$$(1/\rho1)-(1/\rho0)=M/B=\text{constant} \qquad (17)$$

The conditions for achieving the maximum elastic energy as stored in the mainspring as a whole are provided by the following equation on the assumption that the maximum amount of elastic strain of the mainspring is $\epsilon$max:

$$B/M=t/4\epsilon\text{max} \qquad (18)$$

When the mainspring length as measured along the curve from the winding start center is L', the following relationship stands:

$$1/\rho1=(\pi/tL')^{1/2} \qquad (19)$$

Therefore, from equations (17) and (19):

$$1/\rho0=(\pi/tL')^{1/2}-M/B \qquad (20)$$

Because the inner end of the mainspring is actually wound on the barrel arbor, the actual mainspring length L is as follows on the assumption of a barrel arbor radius $\gamma$:

$$L=L'-\pi r^2/t \qquad (21)$$

The metal equation for the ideal curve shape is as expressed by equation (22):

$$\rho0=2(\pi/t)\times(B/M)^3\times(1/L)+B/M \qquad (22)$$

Therefore, the radius of curvature $\sigma0$ in the free-exploded shape at the maximum energy stored in the mainspring can be expressed, from equations (18) and (22), as follows:

$$\rho0=2(\pi/t)\times(t/4\epsilon\text{max})^3\times(1/L)+t/4\epsilon\text{max} \qquad (23)$$

With $\epsilon$max=0.02, the pitch of the spiral shape of the ideal curve becomes completely smaller than the thickness t of the mainspring. Actually, therefore, a shape close to $\epsilon$max=0.02 would be used in place of the result of calculation.

Representation of equation (23) in FIG. 3 described above would take the form of graph G4: it suggests the possibility of forming a calculated curvature changing point on the inner side from graph G3 of a mainspring made of the conventional material.

With the amorphous mainspring, it is therefore possible to reform the entire length of the mainspring in a direction counter to the winding direction, and thus to increase the stored energy upon tightly winding.

The foregoing equation (1) is a basic equation for theoretical calculation, and equation (22) is as well a theoretical equation determinable from this basic equation. In practice, it is necessary to take account of occurrence of frictions between mainsprings and between the mainspring and the barrel drum and the necessity of a winding margin for connecting the mainspring and the barrel arbor.

Therefore, when the correction coefficient of frictions is K1, and the number of turns for winding the mainspring around the barrel arbor, the relationship between the number of turns N and the output torque T for the mainspring of the conventional material is:

$$T = K1 - (Ebt^3\pi/6L) \times (N - No) \quad (24)$$

Therefore, as shown in FIG. 4, as compared with the output torque property G6 of the mainspring of the conventional material, the output torque property G5 of the amorphous mainspring exhibits, though with the same number of turns, a smaller inclination of the curve and a smaller change in torque caused by a change in the number of turns. Because the same number of torque leads to a higher torque, the period of endurance increases, and the driving mechanism can be operated for a longer period of time.

3. Formation of Amorphous Mainspring in Optimum Shape

When using the above-mentioned spring made of the amorphous metal as a mainspring, an amorphous mainspring should preferably be manufactured by integrally laminating two, three or more amorphous metal sheets, since it is difficult to manufacture a mainspring having a thickness t of over 50 µm from a single sheet.

More specifically, because amorphous metal sheets are laminated, as is known from equations (1), (22) and (23), it is possible to freely set an amorphous mainspring thickness t in response to the required performance including an output torque.

When integrally laminating the sheets, the plurality of amorphous metal sheets should preferably be bonded with a synthetic resin adhesive.

The synthetic resin adhesive permits achievement of integral lamination of the plurality of amorphous metal sheets at a relatively low temperature. Properties of the amorphous metal therefore never change, and the aforementioned features of the amorphous mainsprings are never affected.

More particularly, it suffices to adopt an adhesive which sets at a temperature of up to about 300° C., i.e., the temperature at which properties of the amorphous metal change. An epoxy-based adhesive, for example, sets at about 100° C., and properties of the amorphous metal never change at this temperature.

Because the adhesive easily deforms before completion of setting, reforming of the foregoing amorphous mainspring can be easily accomplished by winding the same on a jig or the like.

Further, it is not necessary to apply a separate heat treatment for reforming as in the conventional mainspring, thus enabling a simplified manufacturing process of the mainspring. Reforming of the amorphous mainspring can be accomplished also by spot-welding the inner end portion, the curvature changing point portion and the outer end portion of each of the plurality of amorphous metal sheets. Effects similar to those mentioned above are available also by using the thus integrally laminated spring as a fixing spring or a click spring of a crystal oscillator.

4. Driving Mechanism Using Amorphous Mainspring

The driving mechanism using the mainspring of the present invention is based on a mainspring comprising the above-mentioned amorphous mainspring and a train wheel for transmitting mechanical energy of this mainspring. It has a plurality of amorphous mainsprings and a plurality of barrel drums for housing these mainsprings, wherein the plurality of barrel drums simultaneously engage with the train wheel.

More specifically, because the plurality of barrel drums housing the amorphous mainsprings are simultaneously engaged with the train wheel, an output torque composed of superposed torque outputs from the plurality of barrel drums acts on the train wheel, thus making it possible to cause a large torque to act on the train wheel, and hence to operate the driving mechanism with a high torque.

In the configuration as described above, phases of engagement of the plurality of barrel drums with the train wheel should preferably shift from each other.

Because the phases of engagement are staggered, a change in torque produced by engagement between a barrel drum with the train wheel can be offset by engagement with another barrel drum. It is thus possible to inhibit dispersion of torque transmitted from the entire barrel drums to the train wheel and to operate the driving mechanism smoothly.

BEST MODE FOR CARRYING OUT THE INVENTION

Embodiments of the present invention will now be described with reference to the drawings.

Figure 5:
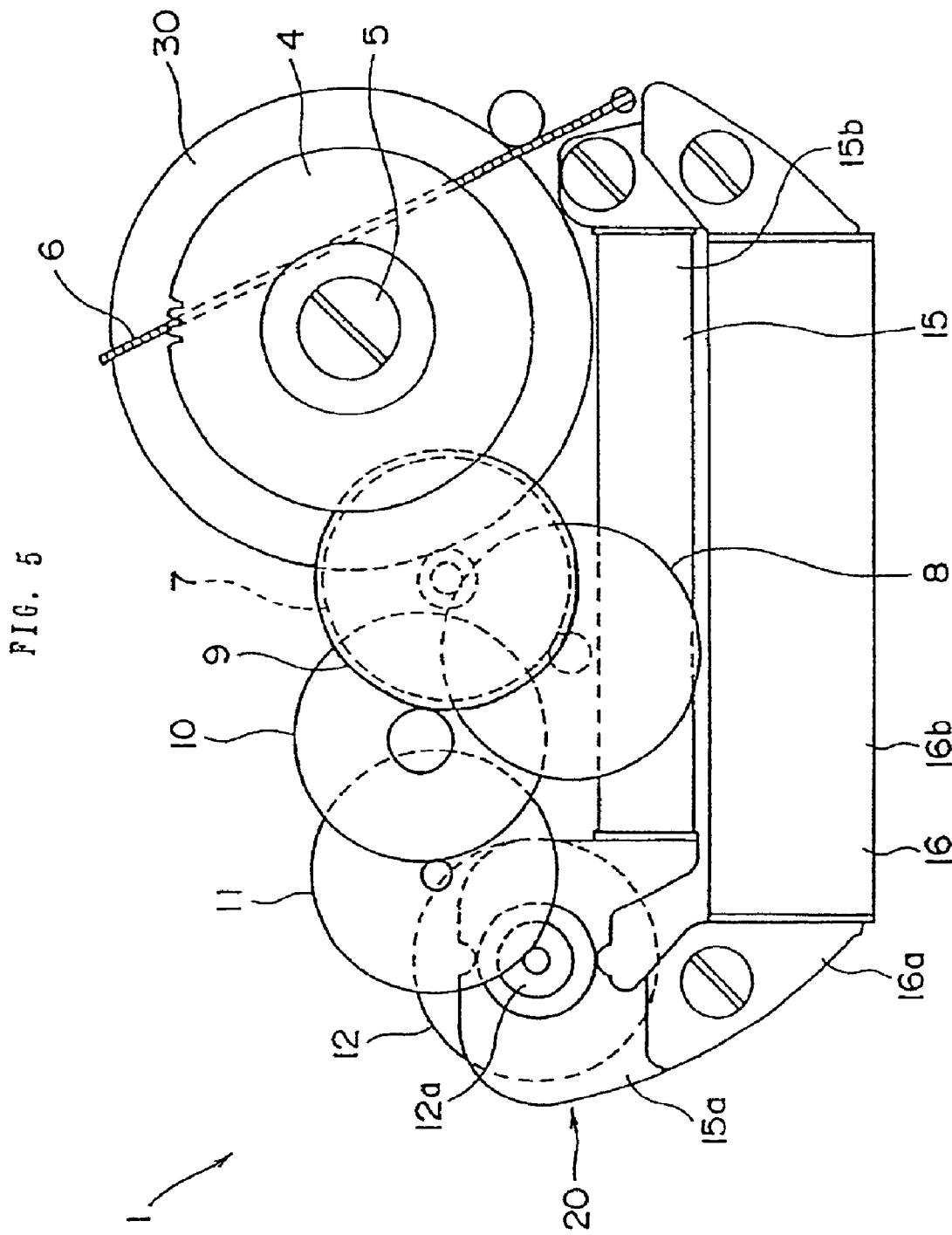
FIG. 5 is a plan view illustrating a driving mechanism using an amorphous mainspring of a first embodiment of the invention.
Figure 6:
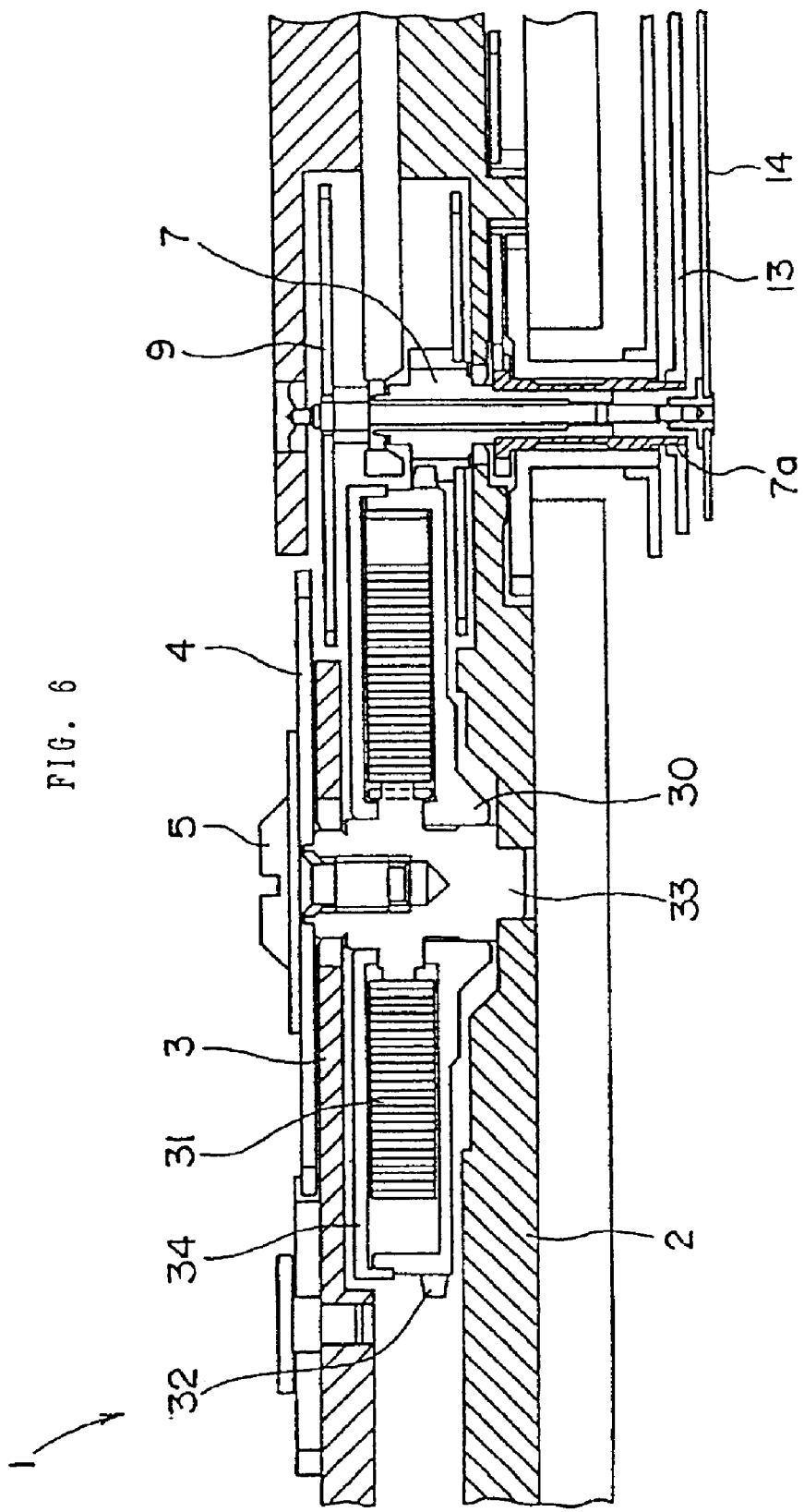
FIG. 6 is a sectional view of the driving mechanism of the first embodiment shown in FIG. 5 taken along line A—A.
Figure 7:
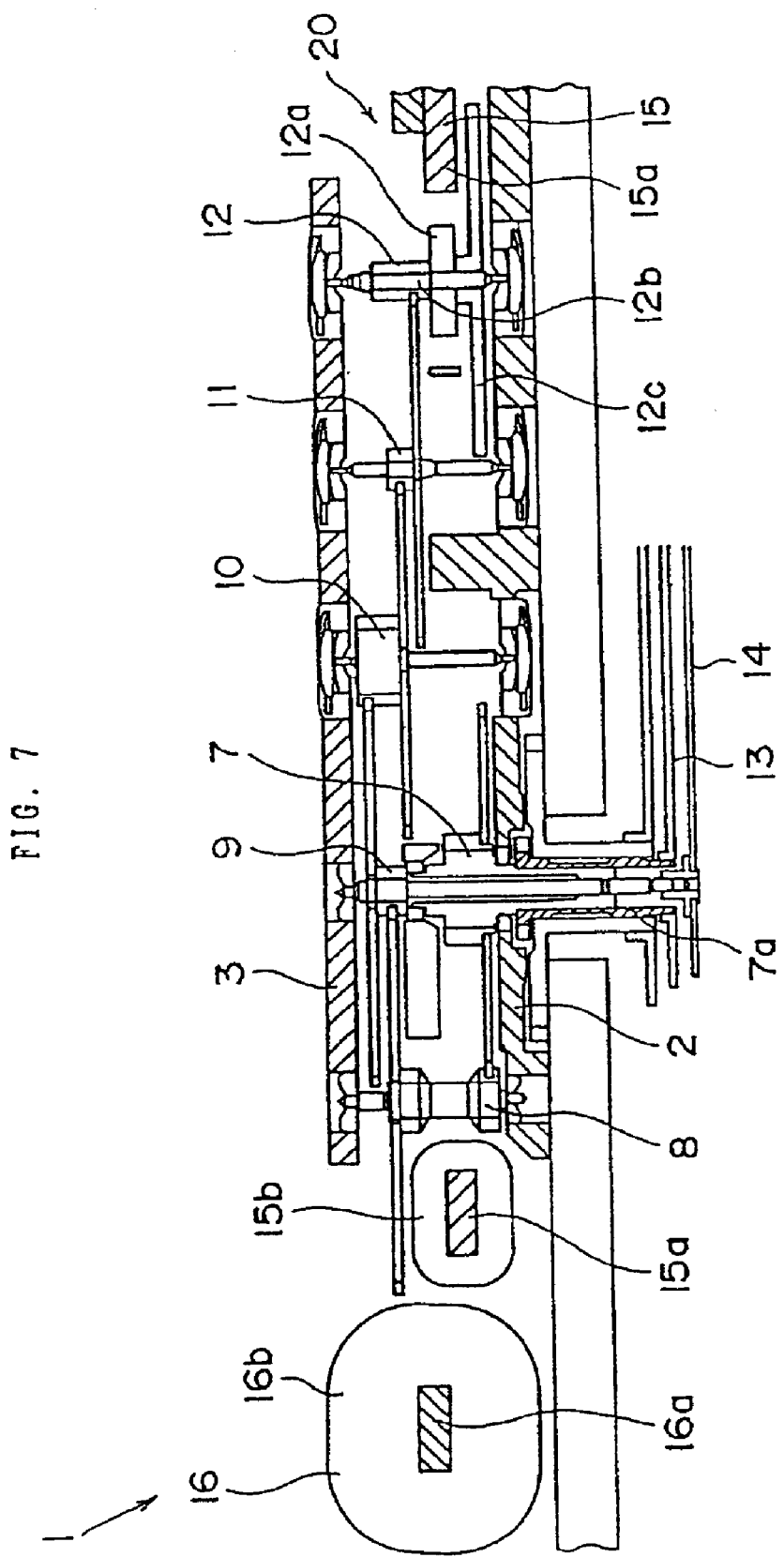
FIG. 7 is another sectional view of the driving mechanism of the first embodiment shown in FIG. 5 taken along line B—B.

A first embodiment relates to a driving mechanism using the spring of the invention as a mainspring. FIG. 5 is a plan view illustrating a driving mechanism of a electronically controlled mechanical timepiece using the amorphous mainspring of the first embodiment of the invention; and FIGS. 6 and 7 are sectional views thereof.

The driving mechanism 1 of the electronically controlled mechanical timepiece is provided with a barrel drum 30 having an amorphous mainspring 31, a barrel gear 32, a barrel arbor 33 and a barrel cover 34. The amorphous mainspring 31 has an outer end connected to the barrel gear 32 and an inner end fixed to the barrel arbor 33. The barrel arbor 33 is supported by a main plate 2 and a train wheel bridge 3, and secured by a ratchet wheel screw 5 to as to rotate integrally with a ratchet wheel 4.

The ratchet wheel 4 engages with a click 6 so as to rotate clockwise but not counterclockwise. Because the method of winding the amorphous mainspring 31 by rotating the ratchet wheel 4 clockwise is the same as in automatic winding or manual winding of a mechanical timepiece, description thereof is omitted here.

Rotation of the barrel gear 32 is increased to seven times as high and transmitted to a center wheel 7, then sequentially, 6.4 times to a third wheel 8, 9.375 times to a second wheel 9, three times to a fifth wheel 10, ten times to a sixth wheel 11, and ten times to a rotor 12: the rotation speed is thus increased to 126,000 times as high, and these wheel gears compose a train wheel.

A cannon pinion 7a is secured to the center wheel 7, a minute hand 13, to the cannon pinion 7a, and a second hand 14, to the second wheel 9. In order to rotate the center wheel at 1 rph, and the second wheel 9 at 1 rpm, therefore, it suffices to perform control so as to rotate the rotor 12 at 5 rps. At this point, the barrel gear 1b rotates at ⅟₇ rph.

As depicted in FIG. 6, the amorphous mainspring 31 is spiral in shape and is arranged to lie in a single plane.

This electronically controlled mechanical timepiece has a generator 20 comprising a rotor 12, a stator 15, and a coil block 16. The rotor 12 comprises a rotor magnet 12a, a rotor pinion 12b and a rotor inertia disk 12c. The rotor inertia disk is for minimizing dispersion of revolutions of the rotor 12 against dispersion of driving torque from the barrel drum 30. The stator 15 is formed by winding 40,000 turns of stator coil 15b onto a stator body 15a.

The coil block 16 is made by winding 110,000 turns of coil 16b onto a magnetic core 16a. The stator 15a and the magnetic core 15b are made of PC permalloy or the like. The stator coil 15b and the coil 16 are connected in series so as to give an output voltage added with respective generated voltage.

AC output generated by the generator 20 as described above is fed to a control circuit incorporated with a view to controlling speed adjustment and to turn-on/off of the driving mechanism 1, although not shown in FIGS. 5 to 7.

Figure 8:
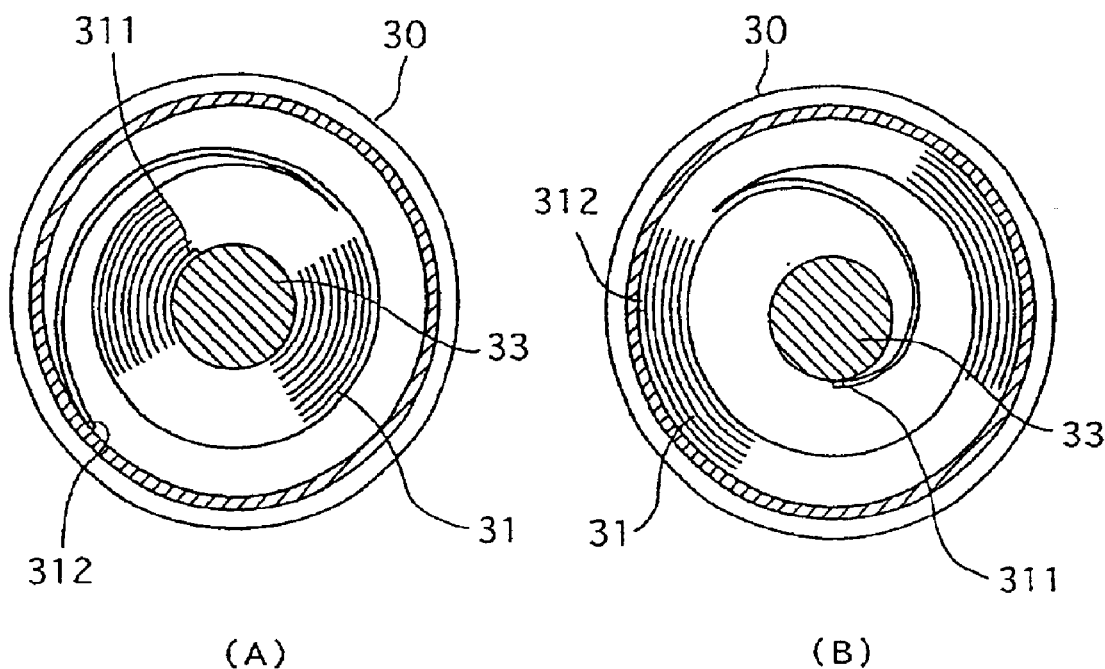
FIGS. 8A–B are plan views illustrating a mainspring housed in a barrel drum in the first embodiment shown in FIG. 5.

Then, the internal structure of the aforementioned barrel drum 30 will be described with reference to FIG. 8.

FIG. 8(A) illustrates a state in which the aforesaid amorphous mainspring 31 is tightly wound in the barrel drum 30; and FIG. 8(B) shows a state after the amorphous mainspring 31 is released in the barrel drum.

The amorphous mainspring 31 has a size comprising a width b of 1 mm, a thickness t of 0.1 mm, and a total length L of 300 mm.

As described above, the amorphous mainspring 31 has the inner end 311 wound onto the barrel arbor 33, and the outer end 312 connected and fixed to the inner surface of the barrel arbor.

When the barrel drum 30 is rotated by an external force relative to the barrel arbor 33 in the state of FIG. 8(B), the amorphous mainspring 31 is tightly wound. When, after tight winding, the mainspring is released from constraint of the barrel drum 30, the barrel drum 30 rotates along with rewinding of the amorphous spring 31. The train wheel including the center wheel 7 described above is rotated by the barrel gear 32 formed on the outer periphery of the barrel drum 30, leading to operation of the minute hand 13 and the second hand 14.

Figure 9:
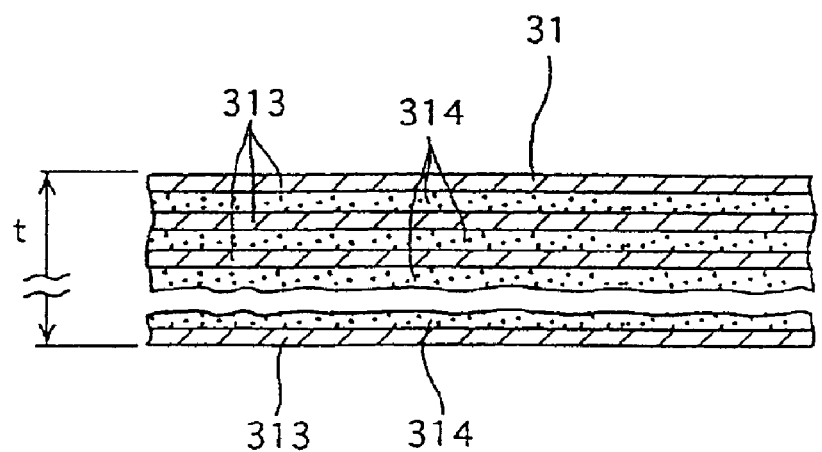
FIG. 9 is a sectional view of the mainspring of the embodiment shown in FIG. 5 cut along the thickness direction thereof.
Figure 10:
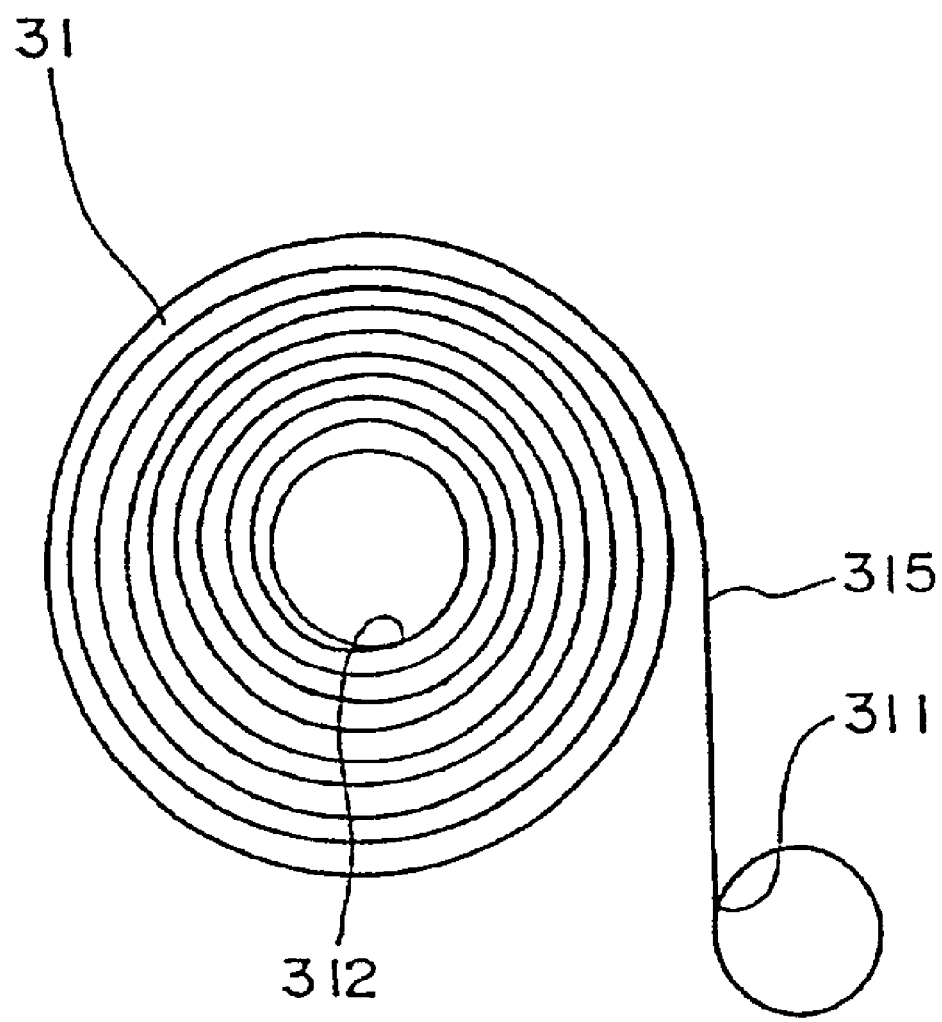
FIG. 10 is a plan view illustrating a free-exploded shape of the mainspring in the embodiment shown in FIG. 5.

The amorphous mainspring 31 is formed by integrally laminating a plurality of amorphous metal sheets 313 each having a thickness of 50 μm as shown in FIG. 9, and the individual amorphous metal sheets 313 are bonded with each other with an epoxy-based adhesive 314.

The amorphous mainspring 31 removed from the barrel drum 30 is reformed in a direction counter to the winding direction onto the barrel arbor 33, and has substantially an S-shaped free-exploded shape in a plan view.

The curvature changing point 315 where the curving direction changes is formed near the inner end 311. The portion between the curvature changing point 315 and an inner end 311 is used for securing the amorphous mainspring 31 to the barrel arbor 33.

When manufacturing such an amorphous mainspring 31, the amorphous metal sheet 313 is first fabricated into a width and a length necessary as a power source for the driving mechanism 1.

The individual amorphous metal sheets 313 are bonded to each other with the use of an epoxy-based adhesive 314 to ensure a thickness t (0.1 mm) necessary for the amorphous mainspring 31.

Finally, before setting of the epoxy-based adhesive 314, the amorphous mainspring 31 is reformed by winding it onto a round rod or the like, and the epoxy-based adhesive 314 is caused to set.

According to the amorphous mainspring 31 of the first embodiment as described above, the following advantages are available.

First, since the amorphous mainspring 31 is adopted as the power source for the driving mechanism 1, it is possible to operate the driving mechanism 1 for a long period of time while maintaining downsizing of the driving mechanism 1.

When a conventional mainspring is incorporated in the aforementioned driving mechanism 1, operation stops in 40 hours from the tight winding. When the amorphous mainspring 31 is incorporated, in contrast, operation is discontinued in 45 hours from the tight winding, resulting in an increase in operable hours by about 10%.

Second, because the curvature changing point 315 can be set at a position near the inner end 311, reforming can be applied over substantially the entire length of the amorphous mainspring 31, thus making it possible to increase mechanical energy stored by the amorphous mainspring 31, and further extend operating hours of the driving mechanism 1.

The amorphous mainspring 31 has only a slight dispersion of torque. When adopting it as a power source of a mechanical timepiece, therefore, it is possible to improve driving accuracy.

Third, in the conventional art, a mainspring having a prescribed thickness has been obtained by repeatedly rolling a bulk material.

The above-mentioned amorphous mainspring 31 can easily be manufactured into a wire, a ribbon or the like by the single-roll process, the dual-roll process or the rotation underwater spinning process. It is therefore possible to simplify the manufacturing process of the amorphous mainspring.

Finally, a plurality of amorphous metal sheets 313 are integrally laminated with the use of an epoxy-based adhesive 314. A heating process is not therefore necessary for forming the amorphous mainspring 31, and properties of the amorphous metal are never damaged.

Since reforming can be effected before setting of the adhesive, reforming can be accomplished easily by, for example, winding the mainspring 31 onto a jig or the like.

A driving mechanism using the amorphous mainspring of a second embodiment of the invention will now be described. For the same or similar components as those already explained, description will be omitted or simplified hereafter.

In the driving mechanism 1 of the aforementioned first embodiment, only one amorphous mainspring 31 housed in the barrel drum 30 has served as the power source for operating the driving mechanism 1.

Figure 11:
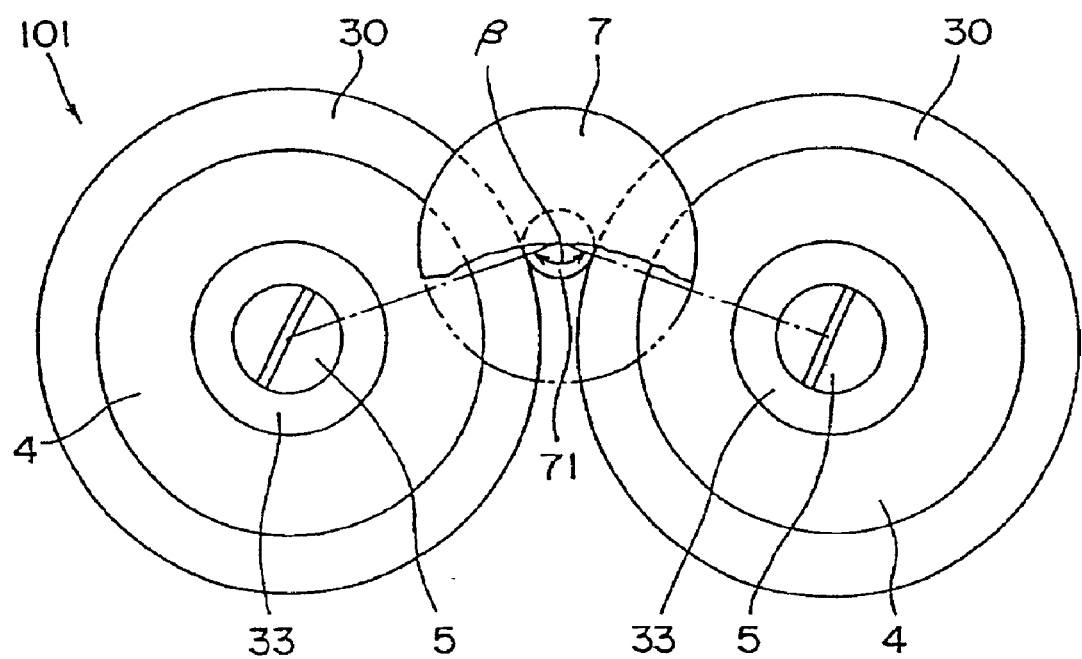
FIG. 11 is a partially cutaway plan view illustrating a driving mechanism of a second embodiment of the invention.

The driving mechanism 101 of the second embodiment differs from that of the first embodiment, as shown in FIG. 11, in that the driving mechanism 101 has two barrel drums, and amorphous mainsprings 31 housed therein serve as power sources for the driving mechanism 101.

Barrel gears 32 (not shown in FIG. 11) formed on the outer peripheries of two barrel drums 30 simultaneously engage with a base gear 71 of a center wheel 7 of the driving mechanism 101.

The two barrel drums 30 rotate in the same direction around respective barrel arbors 33, and a torque 2T comprising the sum of values of output torque T of the individual amorphous mainsprings 31 acts on the center wheel 7.

Figure 12:
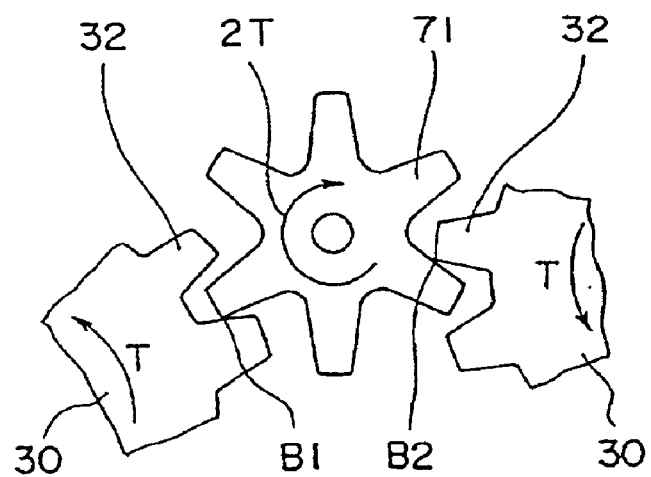
FIG. 12 is a partially cutaway plan view illustrating engagement between barrel drums and a train wheel in the second embodiment shown in FIG. 11.

For the barrel gears 32 engaging with the center wheel 7, as shown in FIG. 12, engagement phases are different between the barrel gear 32 to the left and the barrel gear 32 to the right. At the moment when the left barrel gear 32 comes into contact with the center wheel 7 at point B1, the right barrel gear is about to leave the center wheel 7 at point B2.

Such a difference in phase depends upon the relative positions of the barrel arbors 33. As is known from FIG. 11, the engagement phase can be adjusted in response to the angle 0 between the rotational center of the center wheel 7 and the barrel arbor 33.

According to the driving mechanism 101 using the amorphous mainspring of the second embodiment as described above, the following advantages are available in addition to those described above as to the first embodiment. Because the two barrel drums 30 housing the amorphous mainsprings 31 are simultaneously engaged with the center wheel 7 forming the train wheel, it is possible to cause the center wheel 7 to rotate by superposing values of output torque T of the respective barrel drums 30, and thus to operate the driving mechanism 101 at a high output torque 2T.

Because the phases of the barrel gears 32 engaging with the center wheel 7 are staggered, operation of the driving mechanism 101 can be smoothed by inhibiting changes in the transmitted torque through alleviation of torque dispersion produced from a state of engagement between, for example, the left barrel drum 30 and the center wheel 7 in FIG. 12 by means of the state of engagement with the other right barrel drum 30.

A third embodiment of the invention will now be described. In the third embodiment, the spring made of the amorphous metal of the invention is used as a hairspring for wielding a timed annular balance forming a governor of a mechanical timepiece. A balance hairspring 400 serving as a governor in this embodiment comprises, among others, a balance arbor 410, an annular balance 420, a double roller 430, a collet 440, a stud 450, and a regulator 460, as shown in FIGS. 13 and 14.

The annular balance 420, the double roller 430, and the collet 440 are secured to the balance arbor 410 so as to permit integrated rotation. A hairspring 470 is a non-magnetic spring made of an amorphous alloy, has an inner peripheral end fixed to the collet 440, and an outer end fixed to the stud 450. The regulator 460 comprises, among others, a regulator pin 461 and a regulator key 462, and the outermost peripheral portion of the hairspring 470 passes between the regulator pin 461 and the regulator key 462.

Figure 13:
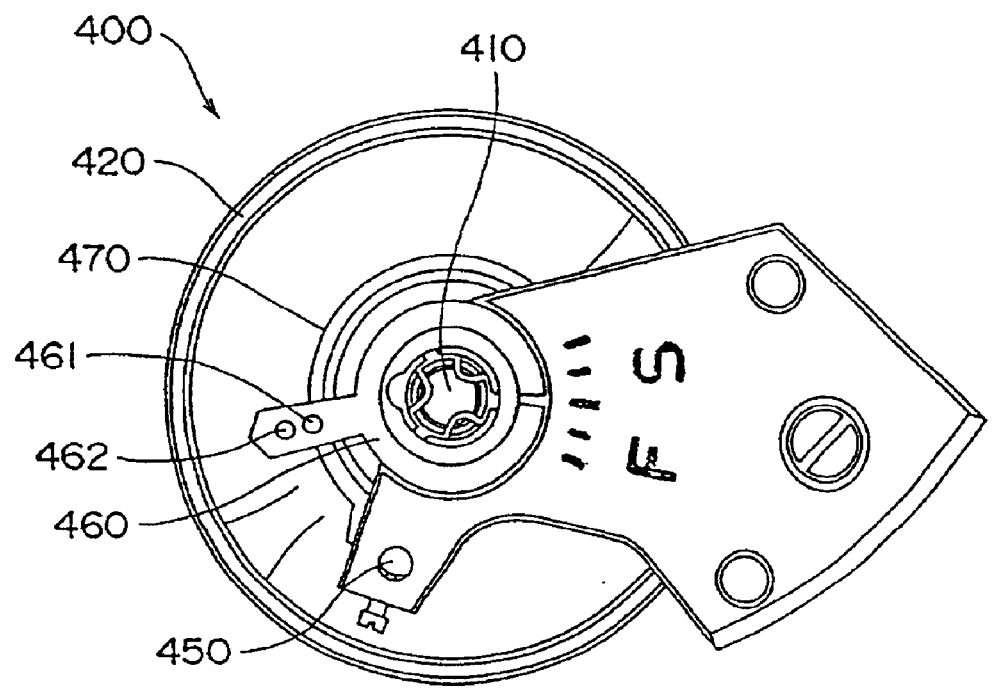
FIG. 13 is a plan view illustrating the structure of a timed hairspring of a third embodiment of the invention.
Figure 14:
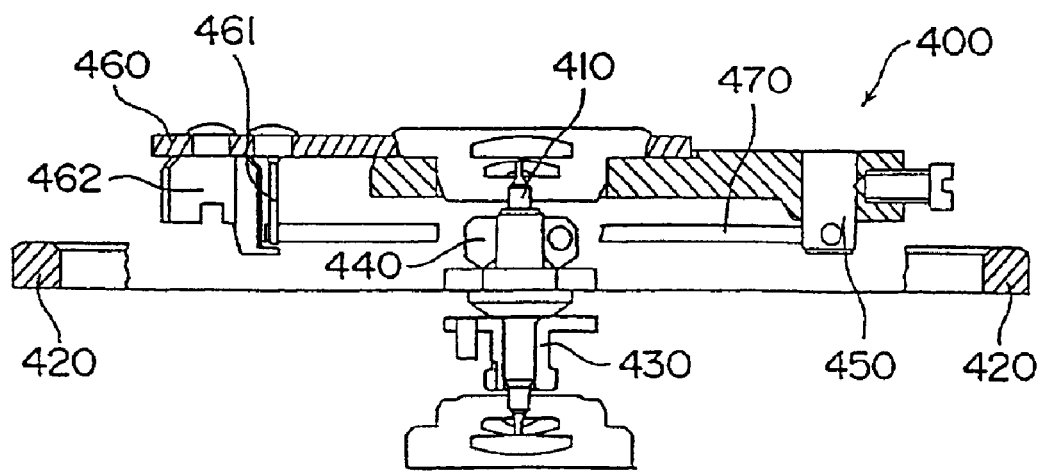
FIG. 14 is a sectional view illustrating the structure of the timed hairspring of the third embodiment in the third embodiment shown in FIG. 13 taken along line C—C.

As also shown in FIGS. 13 and 14, the hairspring 470 is spiral in shape and is arranged to lie in a single plane.

In the balance hairspring 400, when the annular balance 420 rotates around the balance arbor 410 as the axis, the collet 440 rotates also along with this. The wielding force of the hairspring 470 acts on the annular balance 420. Upon achievement of a balance between this wielding force and inertia of the hairspring 470, rotation of the annular balance 420 stops, and the wielding force of the hairspring 470 causes the annular balance 420 to rotate in the reverse direction. That is, the annular balance 420 repeats oscillation with the balance arbor 410 as the axis. The oscillation period of the annular balance 420 can be changed by finely adjusting the position of the regulator key 462. This oscillation period T varies also with the inertia moment J of the rotating portion such as the annular balance as well as with material properties of the hairspring 471). When the hairspring 470 is assumed to have a width b, a thickness t, a spring length L, and a Young's modulus E of the hairspring, T is expressed by the following equation (25):

$$T = 2\pi \sqrt{\frac{12JL}{Ebt^3}} \qquad (25)$$

According to the third embodiment of the invention—as described above, the following advantages are available.

Because the hairspring 470 is made of an amorphous metal, changes in Young's modulus E caused by a change in temperature are slight, with small changes in the oscillation period of the balance hairspring 400 as expressed by equation (25), thus making it possible to improve accuracy of a mechanical timepiece having a governor including the balance hairspring 400.

Since the hairspring 470 is made of a non-magnetic amorphous metal, magnetic resistance is improved, and even when the hairspring 470 is attracted by an external magnetic field or the like, mainspring properties are never impaired.

Figure 15:
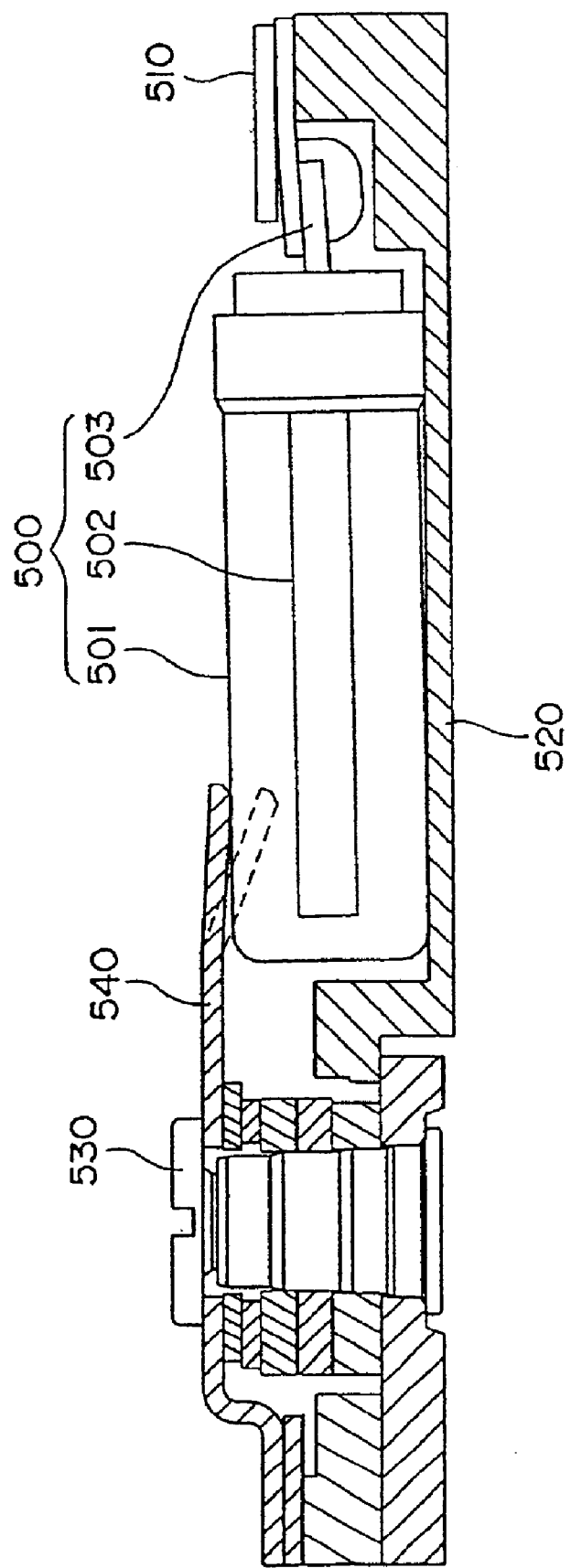
FIG. 15 is a side view illustrating a fixing structure of a crystal oscillator of a fourth embodiment of the invention.

A fourth embodiment of the invention will now be described. The fourth embodiment uses a spring made of the amorphous metal of the invention as a spring for fixing a crystal oscillator of a crystal oscillator type timepiece in a wielded state. More specifically, as shown in FIG. 15, the crystal oscillator 500 comprises, among others, a vacuum capsule 501, and a tuning fork type oscillator 502 housed in this vacuum capsule 501. An oscillation circuit is formed by a terminal 503 provided at an end of the vacuum capsule 501 and electrically connected to a circuit board 510.

The crystal oscillator 500 as described above is arranged on a main plate 520, and fixed thereto while being wielded by a screw 530 and a fixing spring 540 made of art amorphous metal in a direction of being pressed against the main plate 520.

Figure 1:
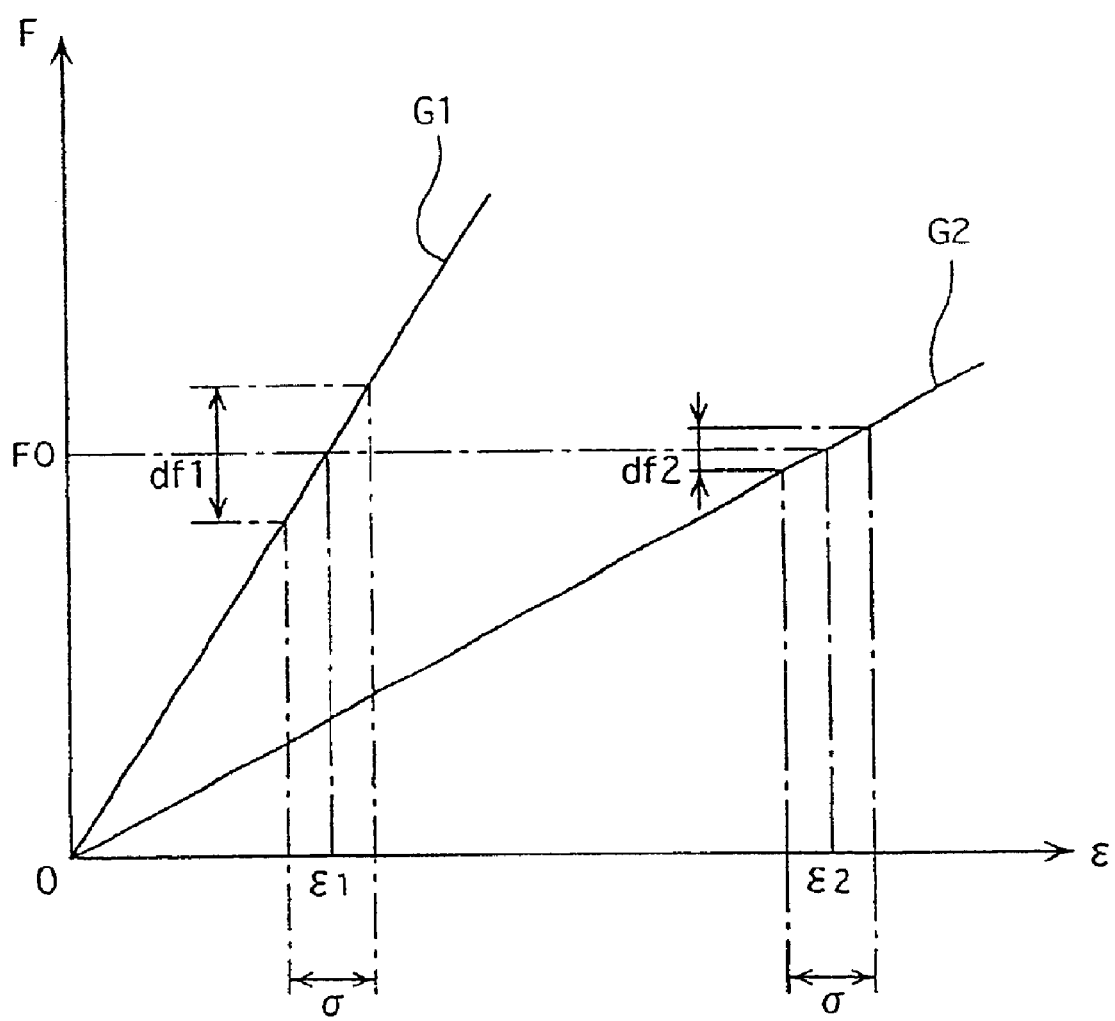
FIG. 1 is a graph illustrating the relationship between strain and wielding force for describing operations of the present invention.
Figure 2:
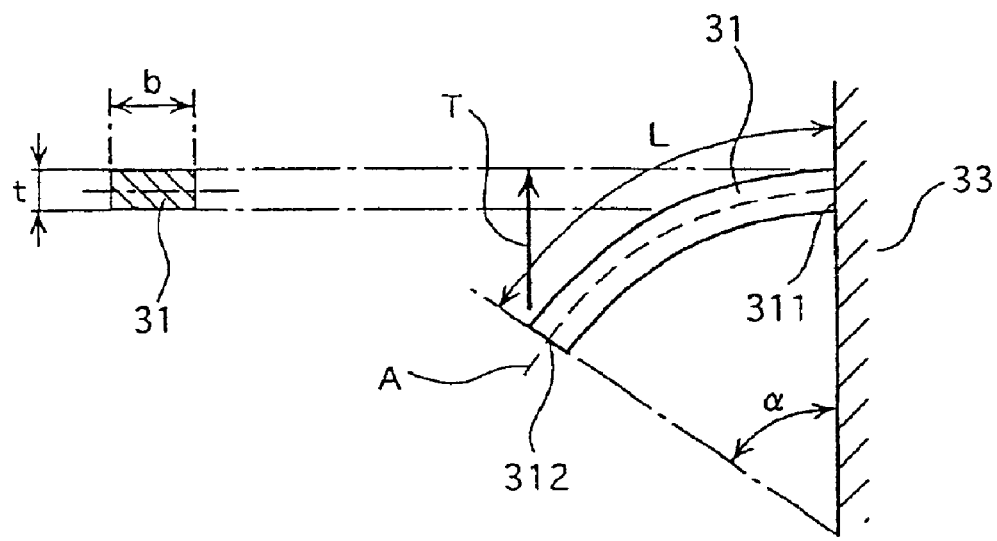
FIG. 2 is a schematic view for explaining operations of the present invention.
Figure 3:
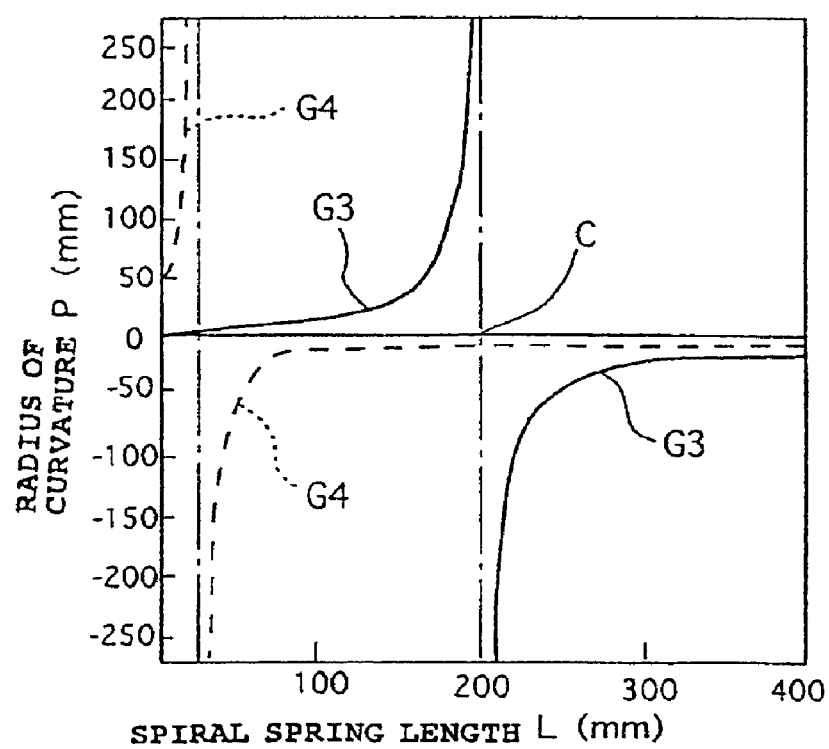
FIG. 3 is a graph illustrating the position of the curvature changing point as derived from the relationship between the mainspring length and the radius of curvature.
Figure 4:
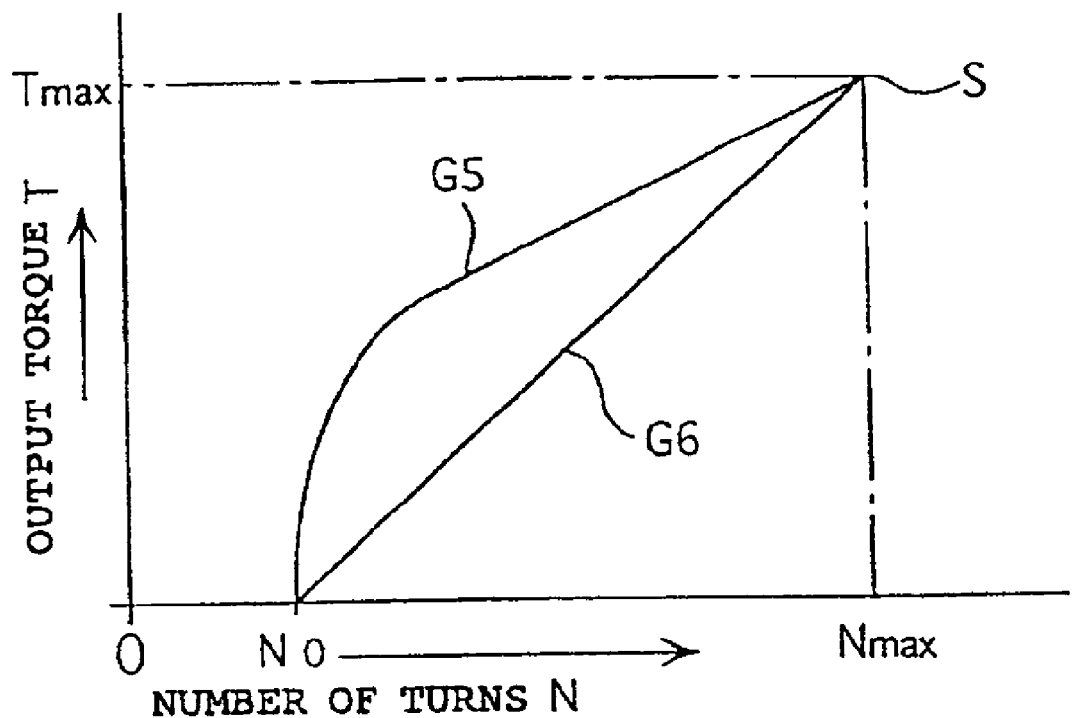
FIG. 4 is a graph illustrating the relationship between the number of turns and the output torque.

According to the fourth embodiment of the invention, the following advantages are available. The fixing spring 530 made of an amorphous metal has a low Young's modulus. The relationship between the amount of flexure of the fixing spring 530 and the wielding force therefore takes the form of graph G2 showing a smaller inclination than in graph GI of the spring made of the conventional material as shown in FIG. 1. Even upon occurrence of a change in the amount of flexure of the fixing spring 530, therefore, a change in the wielding force becomes smaller, thus permitting reduction of the shift of period of the crystal oscillator, and hence, improvement of accuracy of the crystal oscillator type timepiece.

The present invention is not limited to the aforementioned embodiments, but includes also the following variants.

While, in the first embodiment described above, the amorphous mainspring 31 has been used as the power source of the driving mechanism I for the electronically controlled mechanical timepiece, application of the invention is not limited to this, but the amorphous mainspring may be used for a driving mechanism of an ordinary mechanical timepiece having a control system comprising a governor and an escapement.

In the first embodiment described above, the amorphous mainspring 31 has been used as the power source for the driving mechanism 1 of a timepiece. Application of the present invention is not however limited to this, but the amorphous mainspring may be used as a power source for a driving mechanism of a music box or the like.

Further, while the amorphous mainsprings 31 have been integrally laminated by the use of the adhesive 314, integration may be accomplished through spot welding of the inner end 311, the outer end 312 and the curvature changing point 315. Reforming of the amorphous mainspring can be conducted to some extent in this manner simultaneously with integral lamination.

In the second embodiment mentioned above, the two barrel drums 30 have been engaged with the center wheel 7 forming the train wheel. More than two barrel drums 30 may however be engaged. The number of barrel drums 30 may be appropriately selected in response to the energy stored in the amorphous mainspring and the energy required as a power source of the driving mechanism.

In the fourth embodiment described above, the spring made of an amorphous metal has been used as the fixing spring 530 for fixing the crystal oscillator 500, but application is not limited to this. More specifically, the spring forming the click 6 engaging with the ratchet wheel 4 in the first embodiment may be made of an amorphous metal. The click is provided for preventing back-winding when winding the mainspring in the barrel drum, and the spring functioning at this point is the click spring. The click spring is therefore subjected to a repeated load by a number of teeth of engagement with the ratchet wheel in engagement with the click during winding of the mainspring, and this number of times reaches several tens of thousand or even several hundreds of thousand. When such a repeated load is applied, the allowable stress of the click spring should be set to less than ½ of the maximum stress. By using a spring made of an amorphous metal as such a click spring, therefore, it is possible to set a high allowable stress, with smaller dispersion of the wielding force, and the click is favorable also as a click spring.

In addition, the detailed structure and shape for the application of the present invention may be other structure or shape within a range in which the other objects of the invention is achievable.

INDUSTRIAL APPLICABILITY

The spring, the mainspring, the hairspring and the driving mechanism and the timepiece using these springs of the invention is suitably applicable as a power source of a driving mechanism for a timepiece, a music box or the like, as a spring for fixing a crystal oscillator in a crystal oscillator type timepiece or the like, as a hairspring for wielding a timed annular balance of a mechanical timepiece, and as a click spring for preventing back-winding upon winding a mainspring in a barrel drum.

What is claimed is:

1. A timepiece comprising:
a mainspring; and
a substrate receiving at least a portion of the mainspring,
wherein said mainspring is formed of spirally arranged amorphous metal having an S-shaped free exploded shape so that when the mainspring is mounted on the substrate the mainspring has an initial flexure, and said mainspring is spirally arranged so as to lie in a plane.

2. A timepiece as recited in claim 1, wherein said mainspring includes an inner end which serves as a winding side for said mainspring, and an outer end, wherein said free-exploded S-shape has a curvature changing point where the curvature of the free-exploded shape changes, said curvature changing point being located at a point closer to said inner end than to a point midway between said inner end and said outer end.

3. A timepiece as recited in claim 1, wherein said mainspring comprises Ni—Si—B, Ni—Si—Cr, Ni—B—Cr or Co—Fe—Cr amorphous metal.

4. A timepiece as recited by claim 1, wherein said mainspring has a σmax (kgf/mm$^2$) of at least 340 and an E (kgf/mm$^2$) in the range of 9,000–12,000.

5. A timepiece as recited by claim 1, wherein said mainspring has a circular cross-sectional diameter of at least 0.05 mm, or a retangular cross-sectional shape at least 0.01 mm thick and at least 0.05 mm wide.

6. A timepiece as recited by claim 1, wherein said timepiece is an electronically controlled mechanical timepiece further comprising a driving mechanism, a generator and a control circuit, wherein said generator provides an AC output to said control circuit for controlling speed adjustment and to turn said driving mechanism on and off.

7. A timepiece as recited by claim 1, wherein said mainspring comprises an amorphous metal, said mainspring is manufactured using any of a single roll process, a dual roll process or a rotation underwater spinning process.

8. A timepiece as recited by claim 1, wherein said mainspring comprises a non-magnetic amorphous metal.

9. A timepiece as recited by claim 1, wherein said mainspring comprises an amorphous metal, and said mainspring is manufactured by integrally laminating at least two amorphous metal sheets.

10. A timepiece comprising:
a hairspring; and
a substrate receiving at least a portion of the hairspring,
wherein said hairspring is formed of spirally arranged amorphous metal having an S-shaped free exploded shape so that when the hairspring is mounted on the substrate the hairspring has an initial flexure imparted thereto, and said hairspring is spirally arranged so as to lie in a plane.

11. A timepiece as recited in claim 10, wherein said hairspring includes an inner end which serves as a winding side for said hairspring, and an outer end, wherein said free-exploded S-shape has a curvature changing point where the curvature of the free-exploded shape changes, said curvature changing point being located at a point closer to said inner end than to a point midway between said inner end and said outer end.

12. A timepiece as recited by claim 10, wherein said hairspring comprises Ni—Si—B, Ni—Si—Cr, Ni—B—Cr or Co—Fe—Cr amorphous metal.

13. A timepiece as recited by claim 10, wherein said hairspring has a σmax (kgf/mm$^2$) of at least 340 and an E (kgf/mm$^2$) in the range of 9,000–12,000.

14. A timepiece as recited by claim 10, wherein said hairspring has a circular cross-sectional diameter of at least 0.05 mm, or a rectangular cross-sectional shape at least 0.01 mm thick and at least 0.05 mm wide.

15. A timepiece as recited by claim 10, wherein said hairspring comprises an amorphous metal, said hairspring is manufactured using any of a single roll process, a dual roll process or a rotation underwater spinning process.

16. A timepiece as recited by claim 10, wherein said hairspring comprises a non-magnetic amorphous metal.

17. A timepiece as recited by claim 10, wherein said hairspring comprises an amorphous metal, and said hairspring is manufactured by integrally laminating at least two amorphous metal sheets.

18. A drive mechanism for a precision machine comprising:

two barrel drums;

two mainsprings mounted, respectively, in the two barrel drums, each mainspring being formed of spirally arranged amorphous metal having an S-shaped free exploded shape so that when the mainspring is mounted in the barrel drum that mainspring has an initial flexure imparted thereto, and said mainspring is spirally arranged so as to lie in a plane; and a train wheel, said barrel drums simultaneously engaging said train wheel, for transmitting mechanical energy from said two mainsprings.

19. A drive mechanism as recited in claim 18, wherein said two barrel drums are phase shifted from each other when they engage said train wheel.

20. A drive mechanism as recited in claim 18, wherein at least one of said mainsprings comprises Ni—Si—B, Ni—Si—Cr, Ni—B—Cr or Co—Fe—Cr amorphous metal.

21. A drive mechanism as recited by claim 18, wherein at least one said mainspring has a $\sigma$max (kgf/mm$^2$) of at least 340 and an E (kgf/mm$^2$) in the range of 9,000–12,000.

22. A drive mechanism as recited by claim 18, wherein at least one said mainspring has a circular cross-sectional diameter of at least 0.05 mm, or a rectangular cross-sectional shape at least 0.01 mm thick and at least 0.05 mm wide.

23. A drive mechanism as recited by claim 18, wherein at least one said mainspring comprises an amorphous metal, and at least one said mainspring is manufactured using any of a single roll process, a dual roll process or a rotation underwater spinning process.

24. A drive mechanism as recited by claim 18, wherein at least one said mainspring comprises a non-magnetic amorphous metal.

25. A drive mechanism as recited by claim 18, wherein at least one said mainspring comprises an amorphous metal, and at least one said mainspring is manufactured by integrally laminating at least two amorphous metal sheets.

26. A time piece having a drive mechanism comprising:

two barrel drums;

two mainsprings mounted, respectively, in the two barrel drums, each mainspring being formed of spirally arranged amorphous metal having an S-shaped free exploded shape so that when the mainspring is mounted in the barrel drum that mainspring has an initial flexure imparted thereto, and said mainspring is spirally arranged so as to lie in a plane; and a train wheel, said barrel drums simultaneously engaging said train wheel, for transmitting mechanical energy from said two mainsprings.

27. A time piece as recited in claim 26, wherein said two barrel drums are phase shifted from each other when they engage said train wheel.

28. A timepiece having a drive mechanism as recited by claim 26, wherein at least one of said mainsprings comprises Ni—Si—B, Ni—Si—Cr, Ni—B—Cr or Co—Fe—Cr amorphous metal.

29. A timepiece having a drive mechanism as recited by claim 26, wherein at least one of said mainsprings has a $\sigma$max (kgf/mm$^2$) of at least 340 and an E (kgf/mm$^2$) in the range of 9,000–12,000.

30. A timepiece having a drive mechanism as recited by claim 26, wherein at least on of said mainsprings has a circular cross-sectional diameter of at least 0.05 mm, or a rectangle cross-sectional shape at least 0.01 mm thick and at least 0.05 mm wide.

31. A timepiece having a drive mechanism as recited by claim 26, wherein at least one said mainspring comprises an amorphous metal, and at least one said mainspring is manufactured using at least one of a single roll process, a dual roll process or a rotation underwater spinning process.

32. A timepiece having a drive mechanism as recited by claim 26, wherein at least one said mainspring comprises a non-magnetic amorphous metal.

33. A timepiece having a drive mechanism as recited by claim 26, wherein at least one said mainspring comprises an amorphous metal, and at least one said mainspring is manufactured by integrally laminating at least two amorphous metal sheets.

* * * * *

UNITED STATES PATENT AND TRADEMARK OFFICE
CERTIFICATE OF CORRECTION

PATENT NO. : 6,863,435 B2
DATED : March 8, 2005
INVENTOR(S) : Masatoshi Moteki et al.

It is certified that error appears in the above-identified patent and that said Letters Patent is hereby corrected as shown below:

<u>Title page,</u>
Item [62], Related U.S. Application Data, change "Division of application No. 09/297,289, filed on Apr. 28, 1999" to -- Division of application No. 09/297,289, filed on Apr. 28, 1999, now U.S. Pat. No. 6,843,594, which was the National Stage of International Appln. No. PCT/JP98/03828, filed Aug. 28, 1998. --

Signed and Sealed this

Twenty-first Day of June, 2005

JON W. DUDAS
*Director of the United States Patent and Trademark Office*